United States Patent [19]
Günther

[11] 3,890,749
[45] June 24, 1975

[54] REINFORCEMENT ASSEMBLY FOR INTERNALLY BRACED STRUCTURES HAVING AREAL OUTER SURFACES

[75] Inventor: Rolf Günther, Munich, Germany

[73] Assignee: Messerschmitt-Bolkow-Blohm GmbH, Germany

[22] Filed: July 15, 1974

[21] Appl. No.: 488,439

[30] Foreign Application Priority Data
July 18, 1973 Germany............................2336541

[52] U.S. Cl. .......................... 52/84; 52/73; 52/615; 161/44; 244/123
[51] Int. Cl. ......... E04c 2/36; B64c 3/18; B64c 1/24
[58] Field of Search .......... 52/84, 73, 615; 244/119, 244/123, 133; 161/44, 68

[56] References Cited
UNITED STATES PATENTS

| | | | |
|---|---|---|---|
| 2,154,394 | 4/1939 | Clark | 52/73 |
| 2,243,022 | 5/1941 | Thomas | 52/615 |
| 2,258,134 | 10/1941 | Clark | 244/123 |
| 2,410,056 | 10/1946 | Fresco | 244/123 X |
| 2,720,949 | 10/1955 | Pajak | 52/84 X |
| 2,983,038 | 5/1961 | Johnson | 52/615 X |
| 3,312,033 | 4/1967 | Williams | 52/615 |
| 3,396,922 | 8/1968 | Windecker | 244/123 |
| 3,476,422 | 11/1968 | Campbell | 52/615 X |
| 3,519,228 | 7/1970 | Windecker | 244/123 |

FOREIGN PATENTS OR APPLICATIONS
396,231  1/1909  France................................ 244/123

Primary Examiner—Alfred C. Perham
Attorney, Agent, or Firm—Toren, McGeady and Stanger

[57] ABSTRACT

A reinforcement assembly is provided for mounting and transmitting forces to an internally braced structural element having means defining thereon areal outer surfaces. The structural element is of the type particularly suitable for use in vehicles such as aircraft and spacecraft and includes a fulcrum region at which the element is mounted and through which forces are transmitted thereto. The reinforcement assembly comprises plate means located to extend generally parallel to the areal surfaces from the fulcrum region, with a plurality of plates being located on opposite sides of the plate means in overlapping relationship arranged to provide for the structure fiber reinforcement which increases in the direction of the fulcrum region. Web means located to extend between the opposed plate means in directions generally parallel thereto are assembled to extend radially outwardly from the fulcrum region. The ends of the web means located adjacent the fulcrum region are made to converge at an assembly point where the webs are joined by an interconnecting device including a bush.

17 Claims, 16 Drawing Figures

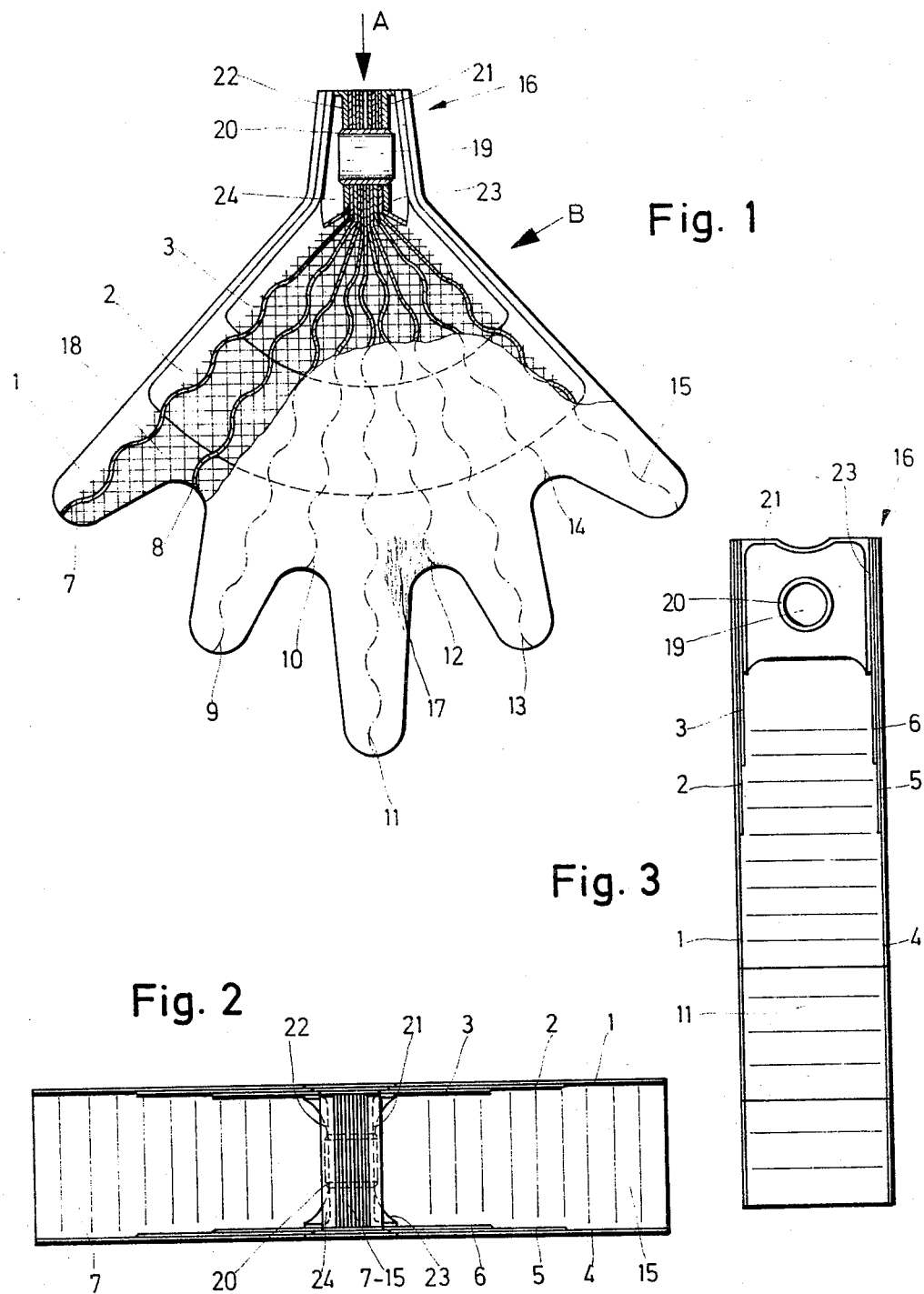

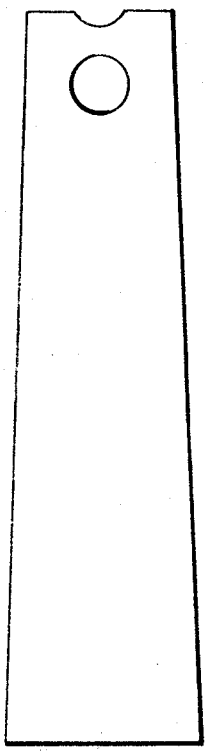
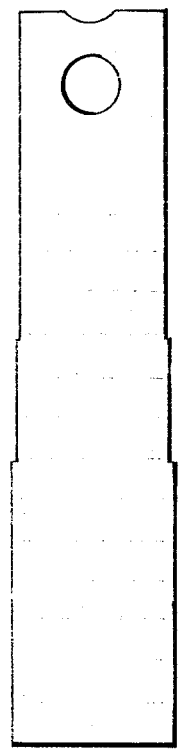
Fig.6　　　Fig.7　　　Fig.8
Fig.9　Fig.10　Fig.11　　Fig.12　Fig.13

REINFORCEMENT ASSEMBLY FOR INTERNALLY BRACED STRUCTURES HAVING AREAL OUTER SURFACES

BACKGROUND OF THE INVENTION

The present invention relates generally to reinforcement assemblies for structural elements of the type particularly useful in vehicles such as aircraft or spacecraft. More particularly, the invention concerns a reinforcement assembly whereby such structural elements may be mounted in place and through which forces may be transmitted.

Structural elements of the type contemplated by the present invention generally comprise an outer skin defining areal outer surfaces with internal bracing being included to form the structural element in a generally sandwich-like configuration. In structural elements of this type, the object is generally to produce a part which is light-weight in construction and which, additionally, may operate to achieve greater efficiency particularly with regard to security against total failure of a vital element. Such elements must usually be constructed to resist partial destruction or damage thereof and to resist fatigue under continuous load.

As a rule, the structures contemplated herein are formed with more or less smooth outer surfaces defined by outer skins which form the contour of the structure in generally planar configurations. The inner part of the structure is usually formed with a system of spars, ribs, stringers, or the like whereby a rigid generally self-supporting overall assembly may be achieved.

Recent technological advances related to the types of structures with which the present invention is involved have provided increasingly safer structural arrangements by the use and development of fiber-reinforced compound materials. As is known, such compound materials are superior in many respects to conventional materials.

Structural elements of the type previously mentioned utilizing conventional materials, are frequently made in a sandwich-like construction in accordance with recently developed techniques. However, in such structures it has been found that the transmission of forces thereto is no longer lacking in problems due to the fact that the sandwich-type plates are only resistant to the introduction of forces if larger parts of the surfaces can be used for articulation. It is only then that the forces acting under load can be transferred to the fulcrums of the elements without damage.

The present invention is aimed at the development of an overall structure which exhibits optimal weight and strength characteristics and which will be safe in operation even if it becomes damaged or partly destroyed. Thus, there may be developed a fail-safe structure, where in an unconventional low-weight construction the forces which are to be introduced and eliminated may be so distributed with a corresponding stress gradient such that the end layers of the sandwich-type structure will be stressed for tension or pressure while the interposed supporting layers are stressed for shear.

The solutions to the problems of stress distribution proposed by the present invention consist, on the one hand, in providing increasing fiber reinforcement for the end layers of the sandwich-like structures extending in the direction of the fulcrum region through which forces are transmitted and, on the other hand, in the provision of webs which extend radially from the fulcrum region and which are located between the end layers.

SUMMARY OF THE INVENTION

Briefly, the present invention may be described as a reinforcement assembly for mounting and transmitting forces to an internally braced structural element having means defining thereon areal outer surfaces, particularly a structural element for use in vehicles such as aircraft and spacecraft, said structural element including a fulcrum region at which the element is mounted and through which forces are transmitted thereto, said assembly comprising plate means extending generally parallel to said areal surfaces internally of said structure from said fulcrum region in overlapping relationship on opposite sides thereof, said plate means being arranged to provide to said structure fiber reinforcement which increases in the direction of the fulcrum region, and web means extending between the opposed plate means in directions generally perpendicular thereto, said web means being arranged to also extend radially outwardly from said fulcrum region.

In the formation of the end layers there are used so-called doublers which comprise reinforcing, additional supporting skin layers which bear tightly on an end layer of the structure. In this connection, there are provided layers of fiber-reinforced compound plates, which extend from the fulcrum region and which become thinner in steps.

The doublers or reinforcing plates may have both a symmetrical and an unsymmetrical outline or arrangement. Preferably, they may be shaped and arranged in accordance with the distribution of the effective loading forces, with the reinforcing layers being arranged in an overlapping relationship and, if necessary, to extend in a unidirectional configuration.

The reinforcing fibers may also be stepped or staggered, depending upon the requirements of a specific case, so that the thickness of the doublers may not be equivalent at all points.

Tests have shown that good results may be obtained with doublers produced in accordance with West German Patent Application No. P 22 63 381.4-24.

The doublers which are to be used in accordance with the invention may be made completely or partly of conventional materials, or they may consist of a combination of compound materials and conventional materials.

In either case, the end layers of the structure absorb the stresses arising from tension and pressure when the element is stressed, and in addition to providing reinforcement, they operate, as required, in a manner giving rise to optimal weight and strength characteristics preventing the extension of cracks. In contrast to the usual box-like construction of prior art techniques, where spars, stringers, ribs and the like, are covered with a substantially nonsupporting skin, the present invention limits the locality of cracks in order to insure that they do not extend to increasingly larger areas of the structural element as stress continues.

Furthermore, the invention proposes a design wherein webs are provided to extend from the fulcrum region with the webs being arranged generally perpendicularly to the reinforcing plates or end layers whereby the webs may form an interconnecting member between such plates or end layers.

In accordance with a further aspect of the invention, extensions in the form of tongues or lips may be provided on the webs, preferably adjacent their edges, in order to enable the webs to be affixed between the reinforcing plates on the inner sides of an upper and lower layer. This gives rise to a firmer attachment of the webs with simplification of the assembly. The geometric shape of the webs and their positioning may be arranged in accordance with the distribution of the effective loading forces, in a manner similar to that referred to in connection with the doublers of the end layers.

It has been found particularly expedient if the webs, in accordance with a further aspect of the invention, are designed to extend in the longitudinal direction with flattened or vertical corrugations.

The advantageous results produced by the present invention involve an increase in strength and the practical exclusion of visibly disadvantageous fatigue phenomena occurring during the time in which the structures produced according to the present invention are used. Particularly advantageous results are achieved if the thickness of the webs is made to increase in a direction taken longitudinally thereof, to about the same degree as the thickness of the end layers which are equipped with either the fiber reinforced compound materials or the combination of several types of materials.

Increased attention must be directed to the composition of the webs within the range of the fulcrum region. According to a further aspect of the invention, a greater density of material may be provided adjacent the fulcrum region by utilization of at least one connecting member which may, for example, be a bush or a flange consisting of the bundled ends of the webs. A connecting member joining the webs together may include a bush fixed by means of an additional molded part such as a metal fitting arranged relative to the top layers of the sandwich-like structure.

Finally, the invention may also include a filling material provided within the cavities between the webs and the reinforcing plates. The filling material may be injected and may, for example, consist of a hard plastic foam. Additionally, the structure of the supporting core may be affixed upon the traversing webs and/or upon the end layers.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1 is a top view partially in section and partially broken away of a force transmitting reinforcing assembly according to the invention;

FIG. 2 is a view of the assembly of FIG. 1 looking toward the fulcrum region in the direction of the arrow A;

FIG. 3 is a side view of the assembly looking in the direction of the arrow B of FIG. 1;

FIGS. 6 and 7 are side views showing two embodiments of webs which may be utilized in the present invention;

FIGS. 8-11 are top views of several different embodiments of web forms which may be utilized in the present invention;

FIGS. 12 and 13 are sectional views which may be taken across a portion of a web along a line XII—XII shown in FIG. 11 showing details of different embodiments of webs according to the invention;

DETAILED DESCRIPTION OF THE PREFERRED EMBODIMENTS

Figures 4, 5:
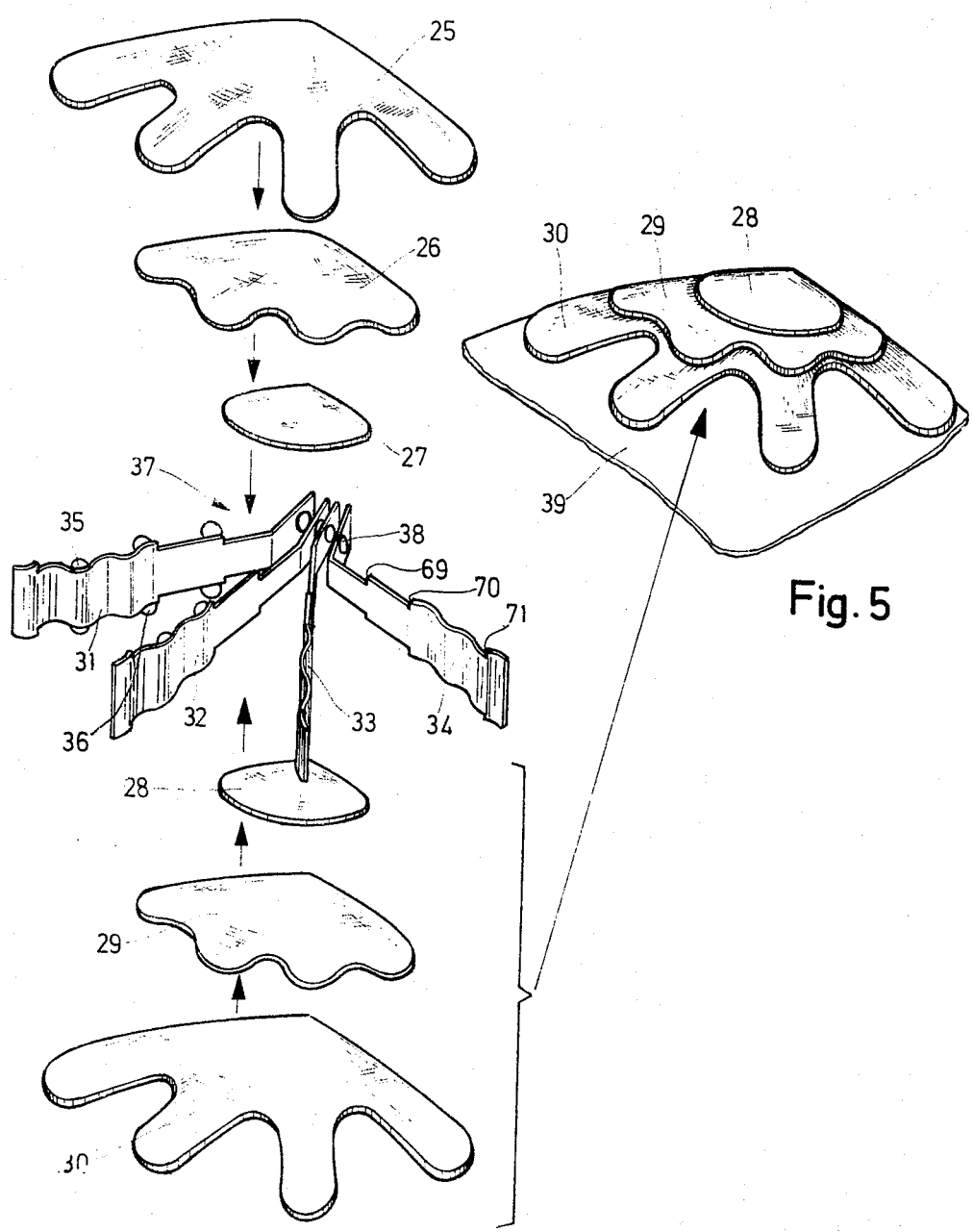
FIG. 4 is an exploded view showing the essential parts of the assembly of the invention.
FIG. 5 is a view in perspective showing a bottom sandwich layer of the reinforcing plates of the assembly shown in FIG. 4.

Referring now to the drawings, it will be seen that the arrangement for transmitting forces into the structural elements of the present invention consists essentially of reinforcing plates or doublers provided for the end layers of the structural element (not shown in the drawings) and of several webs arranged between the reinforcing plates and connecting the plates with each other. Additionally, there is provided a fulcrum region suitably designed for transmitting forces.

As shown in FIGS. 1-3, undulating or corrugated webs 7–15 are arranged between a group of upper reinforcing plates 1, 2 and 3 and a group of lower reinforcing plates 4, 5 and 6. The reinforcing plates of each group are arranged to overlap each other in a graduated configuration so that at or adjacent a fulcrum region 16 the reinforcing plates 1, 2 and 3 of the top group and the reinforcing plates 4, 5 and 6 of the bottom group are superposed relative to each other to the extent that the reinforcement characteristics provided thereby decreases in the direction of the distribution of forces over the thickness of the reinforcing plates 3 and 2, and 6 and 5 respectively, until the reinforcement is effected solely by the plates 1 and 4, respectively, having the largest areas.

The reinforcing plates may be made of fiber-reinforced compound materials having fiber orientations which run in the direction indicated by the reference numeral 17. However, these plates may also be made completely or partly of conventional materials.

Similarly, the webs 7–15 can also be made from fiber-reinforced compound materials or from other suitable materials. It will be noted that, inasmuch as the reinforcement plates 1–3 and 4–6 are overlapped, the spacing therebetween tends to decrease in the direction of the fulcrum region 16. Accordingly, in order to accommodate this diminishing spacing, the webs 7–15 are structured to be narrower in steps in the direction toward the fulcrum region 16 by an amount determined by the thickness of the existing reinforcing plates 1–3 and 4–6, respectively (see FIGS. 3 and 7), thereby to enable the webs to be placed intermediate the plate groupings so that they extend generally perpendicularly thereto.

The spaces which are formed between the webs 7–15 and the reinforcing plates 1–6 are filled with a hard plastic foam 18 (see FIG. 1) in order to further increase the strength of the assembly and to facilitate the manufacture of the entire structure.

Each of the webs 7-15 are configured to converge at the fulcrum region 16 where they are all bound together by means of a bush 20 having a common bore 19 which extends perpendicularly to the plane of the webs. Each of the webs is formed at its bound end with an opening through which the bush 20 extends, with both ends of the bush 20 passing through a pair of center webs 21 and 22 formed as part of a U-shaped pair of metal fittings 23, 24 having edges which are bent to provide surfaces extending generally parallel to the reinforcing plates 1-3 and 4-6, respectively. The reinforcing plates are mounted, at the reinforcing region 16, upon the bent off edges of the fittings 23 and 24 with the plates 1-3 being mounted upon one side thereof while the plates 4-6 are mounted on the other side thereof.

In FIG. 4 there is shown, in an exploded view, an example of a force transmitting assembly according to the present invention formed in a four-fingered configuration, with individual parts of the articulated assembly being omitted for the sake of clarity. In the arrangement depicted, three upper reinforcing plates 25, 26 and 27, and three lower reinforcing plates 28, 29 and 30, are, respectively, joined together in any appropriate manner, as for example by placing an adhesive substance between each of the plates. Between the upper and the lower group of reinforcing plates there are arranged upright webs 31-34. Located at the edges of the webs are tongues 35 and 36 which are bent to extend generally perpendicularly to the body of the web and which may be utilized as connecting points in order to improve the structural rigidity of the assembly. While only a few tongues are depicted in the drawing of FIG. 4, it is to be understood that a sufficient number thereof may be provided whereby the upper group of plates 25-27 and the lower group 28-30 may be assembled to the webs by attachment at the connecting points formed by the tongues 35, 36. At a fulcrum region 37, all the webs 31-34 are brought together to form an apex at which interconnection of the webs may be effected by means of a common bore 38 extending through each of the webs 31-34 to permit passage therethrough of a connecting bush (not shown).

The width of each of the webs 31-34 is reduced in steps as indicated by the reference numerals 69-71 in FIG. 4 in order to adapt the webs to fit within the corresponding spacings which exist between the superposed reinforcing plates and to compensate for the thickness and the number of plates provided.

In FIG. 5 there is shown an exemplary assembly of the reinforcing plates 28-30 wherein the plates are joined by means of diffusion welding, with a top layer 39 of the structural element within which the assembly is to be used being shown as adhered to the bottommost plate by cementing or similar adhesive means.

In FIGS. 6-13 there are shown various embodiments of webs which may be utilized in the structure of the present invention. Inasmuch as the thickness of the end plates within which the webs are mounted may decrease continuously or in steps in the direction of the fulcrum region of the assembly due to the reinforcing plates, the top and bottom edges of the webs should be formed with a corresponding configuration. Accordingly, depending upon the location within which the webs are to be placed, the webs may be formed with a conical shape, as exemplified by the embodiment of a web shown in FIG. 6, or they may be formed tapered in steps in the direction of the fulcrum region as in the exemplary embodiment depicted in FIG. 7.

In FIG. 8 there is shown a sectional view of another embodiment of a web wherein the undulations or corrugations of the web are completely uniform. By a further embodiment of the invention, shown in FIG. 9, instead of an undulation or corrugation, a conical configuration in the web thickness may be advisable in some cases and this approach is exemplified by the embodiment depicted in FIG. 9.

In other cases it may be advantageous to form the undulation of the webs in an irregular arrangement in order to adapt the webs to the distribution of the forces acting on the assembly. Frequently, forms of the type exemplified by the embodiments depicted in FIGS. 10 and 11 may be advantageously used. For example, a trapezoidal web according to FIG. 11 may be utilized with tongues 40 being provided to extend generally perpendicularly to the web surface in order to permit a firm fastening of the web to be effected.

In FIGS. 12 and 13 there are shown two different examples of a cross-sectional configuration which may be effected in a web such as the web of FIG. 11. FIGS. 12 and 13 assume a view taken along the line XII—XII of a web such as that depicted in FIG. 11. In FIG. 12, a web 41 is formed which consists of a single layer of material which may, if necessary, be formed from fiber-reinforced material. The web is formed with a bent edge in order to provide a strip 42 extending generally perpendicularly to the web 41 to provide a means whereby the web may be fastened between an upper and lower layer of the assembly.

Instead of forming the web of FIG. 11 as indicated in FIG. 12, a configuration as shown in FIG. 13 may be provided. FIG. 13 shows a two-layer web wherein a plate forming a tongue 43 is clamped between a pair of material layers 44 and 45 which may be fiber-reinforced, if necessary, with the two layers 44 and 45 being welded together with the tongue 43 also being welded thereto. After bending, the tongue 43 may serve to enable the web to be secured between the upper and lower layers of an assembly.

Figure 14:
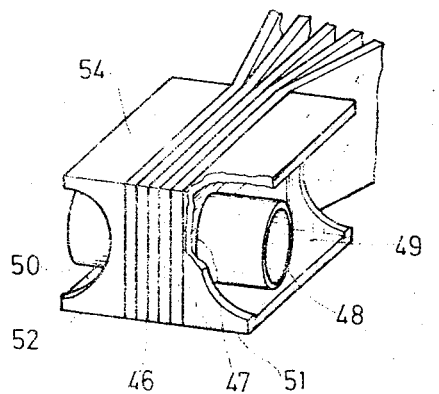
FIG. 14 is a perspective view showing in greater detail a fulcrum region of a force transmitting reinforcement assembly according to the present invention.
Figure 15:
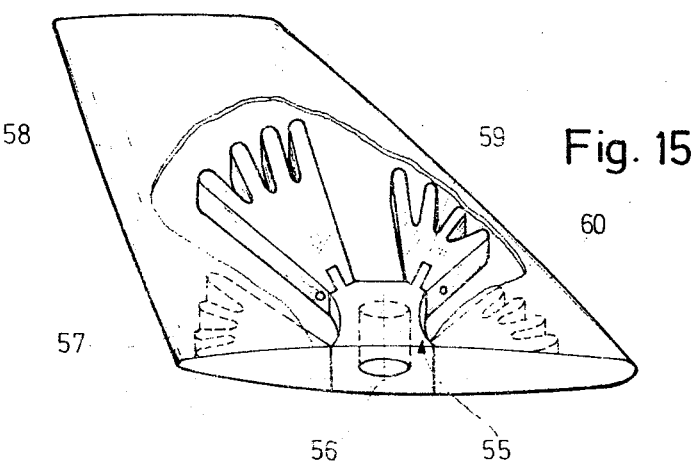
FIGS. 15 and 16 are perspective views showing in simplified form two applications of the force transmitting reinforcement assembly of the invention.

In FIG. 14 there is shown in perspective view a fulcrum region of the assembly of the present invention in greater detail and on an enlarged scale. The webs of the assembly which is depicted comprise ends 46 which are brought together at the fulcrum region in order that they may be joined by a bush 48 which traverses a common bore 47 extending through all of the webs. The bush 48 also traverses the center webs of a pair of U-shaped metal fittings 49 and 50 having lateral arms comprising mounting surfaces 51-54 which may be utilized to affix thereto the reinforcing plates (not shown). An example of a practical application of the subject matter of the present invention is shown in FIG. 15. The invention is shown as mounted within one half of the tail unit of an aircraft whose covering skin is partly broken away to expose the interior of the unit or structural element within which the force transmitting assembly of the present invention is mounted. Air forces acting upon the tail unit, and the control forces which arise during movement of the tail in flight, act jointly upon a bearing box 55 which is secured upon the fuselage by means of a fastening unit 56. These elements are not described in detail but it will be seen that in the bearing box 55 a termination for the fulcrum regions of four force transmitting units 57–60 assembled in accordance with the present invention are provided with each of the units acting to reinforce the tail unit and to enable appropriate distribution and transmission thereto of the forces occurring during operation.

Figure 16:
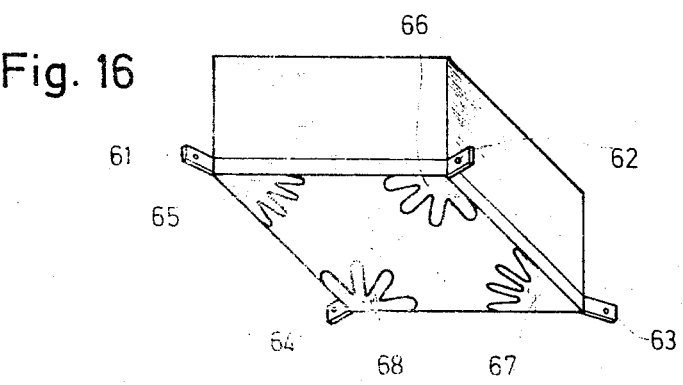

In FIG. 16 there is shown another example of a practical application of the force transmitting reinforcing assembly of the present invention. The perspective view of FIG. 16 is taken obliquely from the bottom of a closed container having four eyelets 61–64 at the corners of the container bottom, with the container and eyelets being utilized for crane loading. The container bottom is built in a sandwich-like construction and is equipped at its corners with force transmitting reinforcement assemblies 65–68 according to the present invention. By utilization of the assemblies 65–68, the structural rigidity and strength and durability of the unit is improved and enhanced.

While specific embodiments of the invention have been shown and described in detail to illustrate the application of the inventive principles, it will be understood that the invention may be embodied otherwise without departing from such principles.

What is claimed is:

1. A reinforcement assembly for mounting and transmitting forces to an internally braced structural element having means defining thereon areal outer surfaces, particularly a structural element for use in vehicles such as aircraft and spacecraft, said structural element including a fulcrum region at which said element is mounted and through which forces are transmitted thereto, said assembly comprising plate means extending generally parallel to said areal surfaces internally of said structural element from said fulcrum region in overlapping relationship on opposite sides thereof, said plate means being arranged to provide to said structural element fiber reinforcement which increases in the direction of said fulcrum region, and web means extending between said opposed plate means in directions generally perpendicular thereto, said web means being arranged to also extend radially outwardly from said fulcrum region in a generally diverging configuration.

2. An assembly according to claim 1 wherein said plate means are formed in layers of fiber reinforced compound plates extending from said fulcrum region, said plates being arranged in groups on opposite sides of said web means with the overlapping relationship of said plates being such that the distance between said groups diminishes in a direction taken toward said fulcrum region.

3. An assembly according to claim 2 wherein said reinforcing plates are formed with an unsymmetrical configuration.

4. An assembly according to claim 3 wherein said reinforcing plates are formed with reinforcing fibers oriented to extend unidirectionally in a direction corresponding to the direction of the distribution of forces through said assembly.

5. An assembly according to claim 2 wherein the overlapping relationship of said reinforcing plates is arranged in a stepped configuration.

6. An assembly according to claim 4 wherein layering of the reinforcing fibers is staggered.

7. An assembly according to claim 1 wherein said plate means comprise plates consisting essentially of compound materials formed in combination with uniform materials.

8. An assembly according to claim 1 wherein said web means extending substantially perpendicularly to said plate means are arranged with said plate means attached on opposite sides thereof.

9. An assembly according to claim 8 wherein said web means include connecting strips formed to extend from said web means and arranged to have said plate means fastened thereon.

10. An assembly according to claim 1 wherein said web means are arranged with a configuration formed in dependence upon the distribution of load forces in said assembly.

11. An assembly according to claim 1 wherein said web means are configured with a longitudinal dimension, said web means being formed with a corrugated configuration extending in the direction of said longitudinal dimension.

12. An assembly according to claim 2 wherein said webs are formed with a thickness which decreases in the direction of the fulcrum region in correspondence with the decrease in the spacing between said group of plate means.

13. An assembly according to claim 1 wherein said web means are formed to consist essentially of compound materials used in combination with uniform materials.

14. An assembly according to claim 1 wherein said web means comprise a group of individual webs extending into abutment with each other at said fulcrum region with each of said webs having a bore extending therethrough at said fulcrum region and wherein at least one connecting member is arranged to extend through each of said bores to join said webs together.

15. An assembly according to claim 14 including a fitting member having said connecting member extending therethrough and cooperating therewith to join said webs together and to have said plate means attached thereto.

16. An assembly according to claim 1 wherein said plate means and said web means are arranged to define cavities therebetween and wherein said cavities are filled with a material forming a supporting interior core for said assembly.

17. An assembly according to claim 1 wherein said structural element is arranged with said reinforcing assembly located internally thereof and with said web means and said plate means being affixed to said structural element.

* * * * *